(12) United States Patent
Magarity et al.

(10) Patent No.: US 10,701,855 B2
(45) Date of Patent: Jul. 7, 2020

(54) FOLDING IMPLEMENT WITH TRACTOR ASSIST

(71) Applicant: CNH Industrial Canada, Ltd., Saskatoon (CA)

(72) Inventors: Brice Magarity, Deer Creek, IL (US); James W. Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 16/682,394

(22) Filed: Nov. 13, 2019

(65) Prior Publication Data
US 2020/0077567 A1      Mar. 12, 2020

Related U.S. Application Data

(62) Division of application No. 15/470,969, filed on Mar. 28, 2017, now Pat. No. 10,506,757.

(51) Int. Cl.
*A01B 73/02* (2006.01)
*A01B 73/06* (2006.01)
*A01B 73/04* (2006.01)

(52) U.S. Cl.
CPC .......... *A01B 73/065* (2013.01); *A01B 73/048* (2013.01); *A01B 73/067* (2013.01)

(58) Field of Classification Search
CPC ..... A01B 73/02; A01B 73/048; A01B 73/065; A01B 73/067

USPC ...................................................... 172/1, 311
See application file for complete search history.

(56) References Cited

U.S. PATENT DOCUMENTS

| | | | | |
|---|---|---|---|---|
| 4,154,451 A * | 5/1979 | Young | ................ | A01B 73/067 172/311 |
| 4,300,640 A * | 11/1981 | Baxter | ................ | A01B 73/067 172/311 |
| 4,301,873 A * | 11/1981 | Baxter | ................ | A01B 73/067 172/311 |
| 6,860,335 B2 * | 3/2005 | Arnett | ................ | A01B 73/065 111/57 |
| 9,668,400 B2 * | 6/2017 | Follmer | ............. | A01B 69/004 |
| 10,506,757 B2 * | 12/2019 | Magarity | ............. | A01B 73/048 |

* cited by examiner

*Primary Examiner* — Gary S Hartmann
(74) *Attorney, Agent, or Firm* — Rebecca L. Henkel; Rickard K. DeMille

(57) ABSTRACT

A towed implement, such as a cultivator is configured between an unfolded operational position and a folded transport position in which wing sections are pivoted about a vertical axis into a forward direction where they are alongside a telescoping tool bar. Sensors on the cultivator send signals initiating the folding/unfolding sequence to send commands through the implement controller to a tractor controller having a ISOBUS class 3 configuration. The tractor is commanded to forward and rearward movement in synchronism with the folding/unfolding process to steer wing supporting wheel assemblies toward the correct position for the intended transport direction.

3 Claims, 3 Drawing Sheets

FOLDING IMPLEMENT WITH TRACTOR ASSIST

CROSS REFERENCE TO RELATED APPLICATIONS

The present application is a divisional non-provisional patent application based on and taking priority from U.S. patent application Ser. No. 15/470,969, titled "FOLDING IMPLEMENT WITH TRACTOR ASSIST," filed Mar. 28, 2017 which is hereby incorporated by reference herein in its entirety.

BACKGROUND OF THE INVENTION

1. Field of the Invention

The present invention relates to towed agricultural implements, and, more particularly, to forward folding agricultural implements.

2. Description of the Related Art

In the quest for additional efficiencies, towed agricultural implements such as cultivators and seeders have been designed with ever increasing lateral spans to increase the efficiency of a given pass through a field. In order to safely transport the implement between fields and to comply with government road clearance requirements, such implements are foldable between the field position and a transport position. One form of configuration is to articulate the outer extremities so that they fold forward or backward from a laterally extending field position to a transport position in which the components are essentially parallel to a tow bar connecting the implement with a tractor. The tow bar for a forward folding agricultural implement is typically telescoping so that it has a retracted operational position and an extended transport position. Alternatively, the outer extremities may be rear folding to the transport position.

While this provides a convenient way of configuring the towed implement between a operational and transport position, it adds additional stresses to ground support wheels for the wing assemblies. The reason is that the tractor, during the fold and unfold operation, remains stationary and the articulation of the components causes side stresses on some of the ground support wheels during the process. In addition, the forces on the ground support wheels can cause ruts in the soil.

Accordingly, it is desirable to provide a folding process that minimizes stresses on the towed implement ground support wheels and ground disturbance.

SUMMARY OF THE INVENTION

The present invention seeks to provide a configuration that minimizes stress on ground support wheels during a fold and unfold operation.

In one embodiment, an agricultural implement is provided for connection to a towing vehicle capable of commanded forward and rearward movement. The agricultural implement is foldable between a laterally extending unfolded operational position and a folded transport position. The agricultural implement includes a center frame having a tow bar for connection to the towing vehicle at the end of the tow bar and at least one ground support wheel assembly on the center frame for guiding towed forward movement. At least one articulated wing frame is displaceable between a laterally extending unfolded operational position and a folded transport position generally parallel to the tow bar. At least one ground support wheel assembly is provided on the at least one articulated wing frame swivel mounted to the wing frame to permit omnidirectional movement. A control system is provided reflecting the initiation of folding and unfolding displacement by the said at least one wing frame for respectively commanding the towing vehicle to move forward and rearward in synchronism with the displacement of the at least on wing frame and the tow bar to steer the swivel mounted ground support wheel assembly toward the correct position for the intended transportation direction during the folding and unfolding process while minimizing movement of the ground support wheel assembly relative to the ground.

In another embodiment, an agricultural implement includes a tractor capable of commanded forward and rearward movement. An agricultural implement is towed by the tractor and includes a center frame having a tow bar for connection to the tractor at the end of the tow bar. The center frame has at least one ground support wheel assembly for guiding towed forward movement. At least one articulated wing frame is connected to the center frame for displacement between a laterally extending unfolded operational position and a folded transport position with the telescoping tow bar being displaceable between a retracted operational positon and an extended transport position as the articulated wing frame is displaced from the operational position to the transport position. At least one ground support wheel assembly is provided on the wing frame and is swivel mounted to the wing frame to permit omni directional movement. A control system includes a sensor reflecting the initiation of folding and unfolding displacement by the at least one wing frame for respectively commanding the towing tractor to move forward and rearward in synchronism with the displacement of the at least one wing frame and the telescoping tow bar to steer the swivel mounted ground support wheel assembly toward the correct position for the intended transportation direction during the folding and unfolding process while minimizing movement of the ground support wheel assembly relative to the ground.

Still another embodiment is directed to a method for minimizing stresses on a ground support wheel for an agricultural implement towed by a tractor capable of commanded forward and rearward movement and having at least one wing frame articulated to be displaced between an unfolded and folded position in which the at least one wing frame pivots forward, the ground support wheel being connected to the at least one wing frame. The method includes the steps of initiating displacement between the unfolded and folded positions. The tractor is then commanded to move forwards and backwards in response to sensing the initiation of wing frame displacement in synchronism so that the ground support wheel is steered toward the correct position for the intended transportation direction during the folding and unfolding process while minimizing movement of the ground support wheel assembly relative to the ground.

An advantage of the invention is minimizing stresses on ground support wheels during a folding/unfolding procedure.

BRIEF DESCRIPTION OF THE DRAWINGS

The above-mentioned and other features and advantages of this embodiment, and the manner of attaining them, will become more apparent and the invention will be better understood by reference to the following description of an embodiment of the embodiment taken in conjunction with the accompanying drawings, wherein.

Corresponding reference characters indicate corresponding parts throughout the several views. The exemplification set out herein illustrates one embodiment and such exemplification is not to be construed as limiting the scope of the invention in any manner.

DETAILED DESCRIPTION OF THE INVENTION

Figure 1:
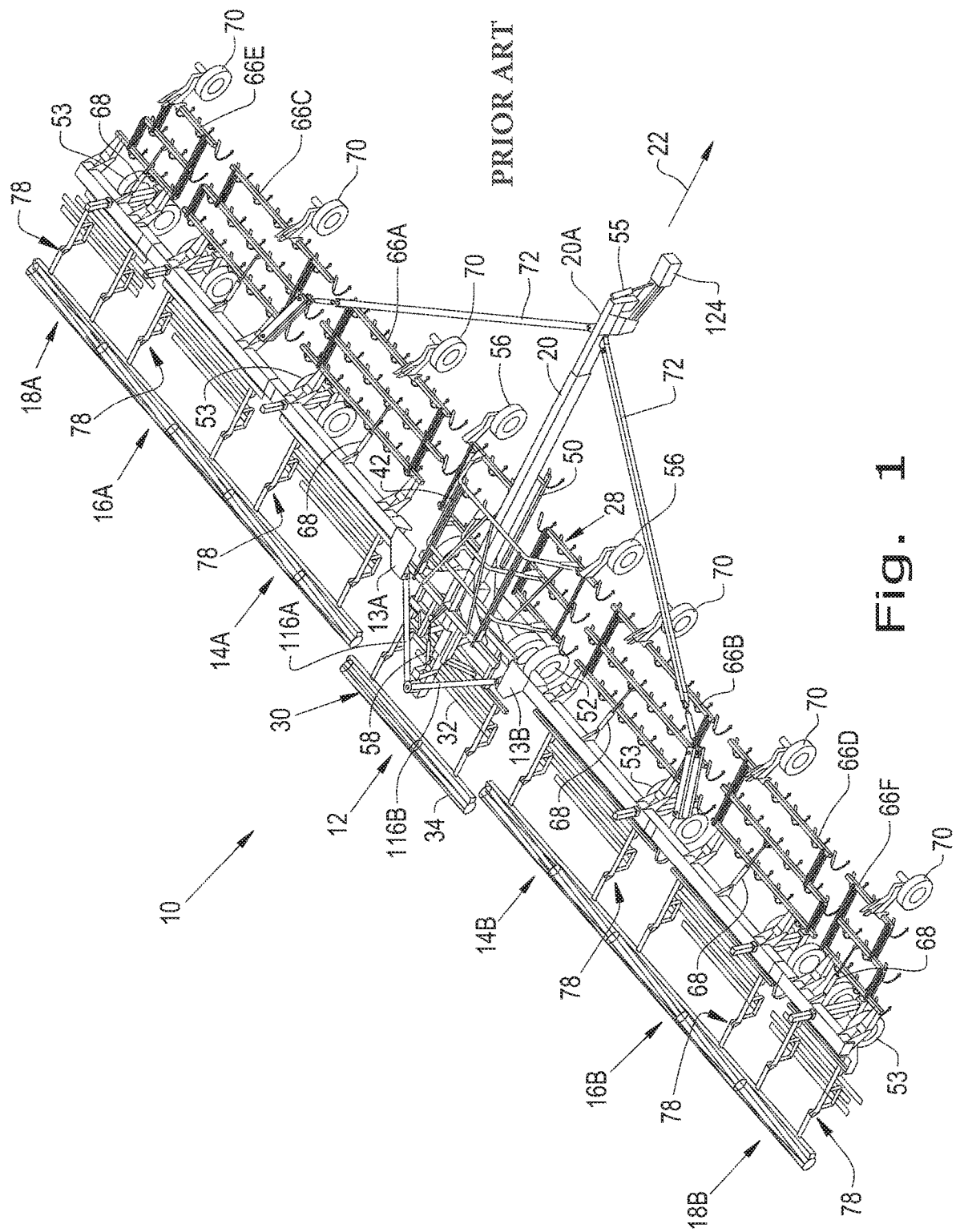
FIG. 1 is a top perspective view of an embodiment of an agricultural tillage implement in the form of a field cultivator.
Figure 2:
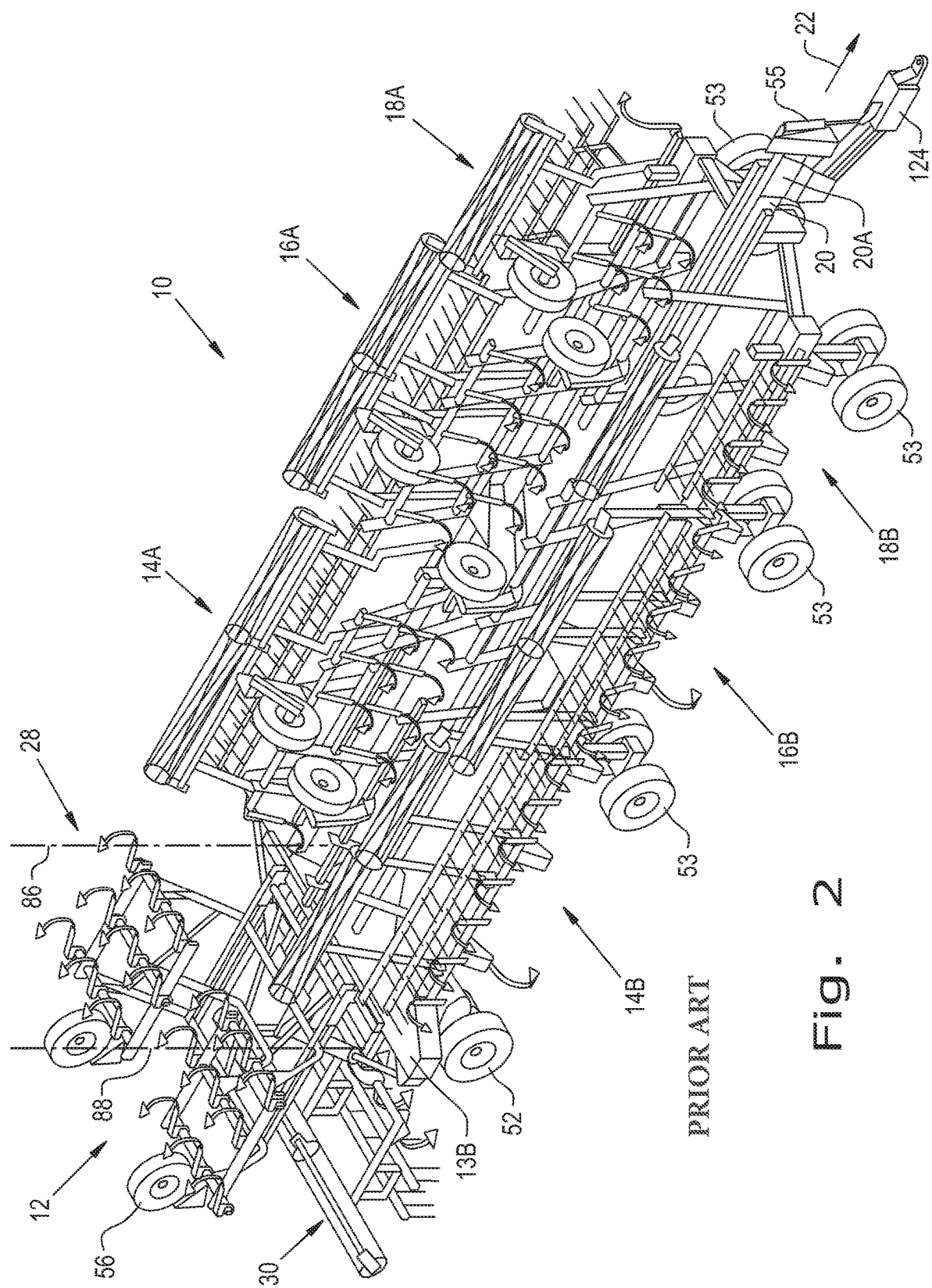
FIG. 2 is a top perspective view of the agricultural tillage implement shown in FIG. 1, with the wing sections folded forward about at least one generally vertical axis to a transport configuration; and, FIG. 3 is a simplified plan view of the agricultural tillage implement shown in FIG. 1, showing displacement between an unfolded to a folded position.

Referring now to the drawings and more particularly to FIGS. 1 and 2, there is shown an embodiment of an agricultural tillage implement of the present invention. In the illustrated embodiment, the agricultural tillage implement 10 is in the form of a field cultivator for tilling and finishing soil prior to seeding.

Agricultural tillage implement 10 is configured as a multi-section field cultivator, and includes a main frame section 12 and a plurality of wing sections 14A, 14B, 16A, 16B, 18A, and 18B. The left wings sections are designated 14A, 16A and 18A, and the right wing sections are designated 14B, 16B and 18B. Wing sections 14A and 14B are each inner wing sections, wing sections 16A and 16B are each middle wing sections, and wing sections 18A and 18B are each outer wing sections. Intermediate wings 13A and 13B may be attached to main frame section 12, and may provide generally vertical axes 86 and 88 about which the plurality of wing sections 14A, 14B, 16A, 16B, 18A, and 18B pivot.

Figure 3:
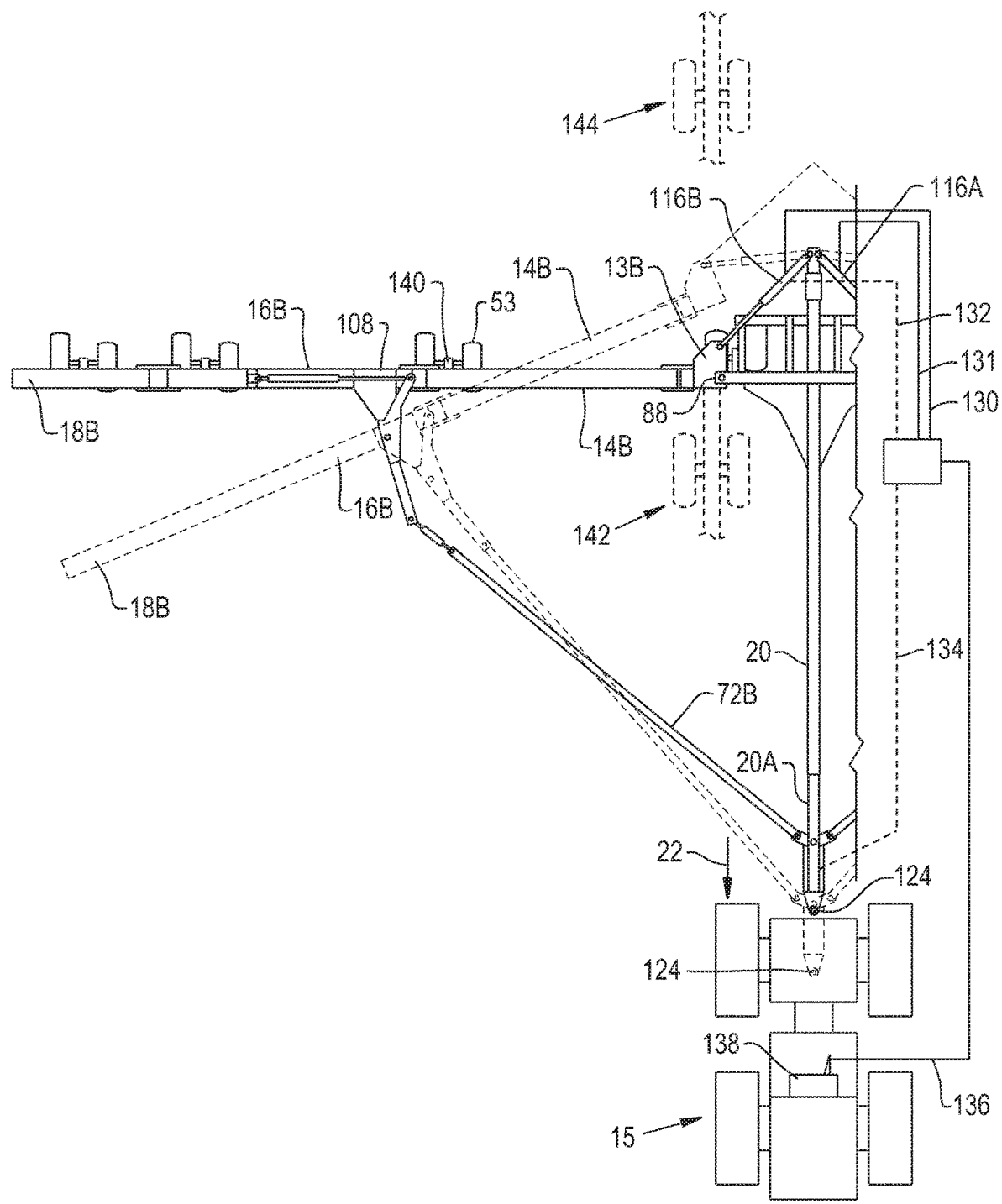

Main frame section 12 is the center section that is directly towed by a traction unit, such as an agricultural tractor 15 (see FIG. 3). Main frame section 12 includes a pull hitch tube or tow bar 20 extending in a travel direction 22, and a tool bar 24 which is coupled with and extends transverse to pull hitch tube or tow bar 20 (FIGS. 2 and 3). Reinforcing gusset plates 26 may be used to strengthen the connection between pull hitch tube 20 and tool bar 24. Tow bar 20 may be telescoping with additional component 20A. Main frame section 12 generally functions to carry a main shank frame 28 for tilling the soil, and a main rear auxiliary implement 30 for finishing the soil. Main rear auxiliary implement 30 includes a spring tooth drag 32 and a rolling (aka, crumbler) basket 34 which coact with each other to finish the soil. However, main rear auxiliary implement 30 can be differently configured, such as a spike tooth drag, cultivator shanks, etc.

Main shank frame 28 generally functions to carry cultivator shanks 36 with shovels 38 at their lower ends for tilling the soil. Main shank frame 28 is pivotally coupled with tool bar 24, preferably at the top of tool bar 24, such as with couplings 40. Main shank frame 28 is positioned in front of the tool bar 24 when in an operating or operational configuration (FIG. 1), and is foldable up and over the tool bar 24 to a position rearward of tool bar 24 when in a transport configuration (FIG. 2). Main shank frame 28 includes two sets of longitudinal frame members 42 which are pivotally coupled with tool bar 24 at one end thereof using couplings 40. A plurality of cross frame members 44 are coupled with the longitudinal frame members 42. Each of the cross frame members 44 have a pair of opposite outboard ends 46 which extend horizontally past longitudinal frame members 42, then in a downwardly angled direction, whereby the outboard ends 46 are positioned on opposite lateral sides of the pull hitch tube 20 when in an operating configuration. The outboard ends 46 of cross frame members 44 are coupled with a pair of respective main shank sub-frames 48. Main shank sub-frames 48 are spaced apart from each other in a direction transverse to pull hitch tube 20 and are positioned on respective opposite lateral sides of pull hitch tube 20 when in an operating configuration.

A center shank sub-frame 50 is attached to and positioned below pull hitch tube 20. Since main shank sub-frames 48 are spaced apart on either side of pull hitch tube 20, center shank sub-frame 50 functions to till the soil in the intermediate open space between the two main shank sub-frames 48. Center shank sub-frame 50 includes a number of cultivator shanks 36 and corresponding shovels 38; three in the illustrated embodiment. Center shank sub-frame 50 may be raised up and down with the raising and lowering of the main frame section 12 using rear lift wheels 52 using hydraulic cylinder 54 and using hydraulic cylinder 55 connected to pull hitch 124. Alternately, center shank sub-frame 50 may be raised or lowered independently of main frame section 12.

Main shank frame 28 also includes one or more gauge wheel assemblies 56 which function to level main shank sub-frames 48. In the illustrated embodiment, main shank frame 28 includes two gauge wheel assemblies 56 which are respectively coupled with a front of a respective main shank sub-frame 48. A hydraulic cylinder 58 is used to fold main shank frame 28 from the operating configuration to the transport configuration, and vice versa. Hydraulic cylinder 58 may optionally be placed in a "float mode" such that gauge wheel assemblies 56 are operable to float up and down as they traverse across a field and thereby set the operating depth at the front edge of main shank frame 28.

Main shank frame 28 may also include additional support frame members 60 and 62 which provide structural rigidity. Support frame members 60 extend diagonally across the top of main shank frame 28, and support frame members 62 extend diagonally between the outboard ends 46 of cross frame members 44.

During use, it is periodically necessary to move the agricultural tillage implement 10 from an unfolded (operating) configuration to a folded (transport) configuration. Hydraulic cylinder 54 may first be actuated to lift the main frame section 12 to the raised transport configuration using rear lift wheels 52 in cooperation with hydraulic cylinder 55 connected to pull hitch 124. Center shank sub-frame 50 may then be independently moved to a raised position if agricultural tillage implement 10 is provided with an independently movable center shank sub-frame 50. Toolbar lift wheels 53 lift wing sections 14A, 14B, 16A, 16B, 18A, and 18B to the raised transport position along with main frame section 12, which toolbar lift wheels 53 are then allowed to caster or pivot.

Hydraulic cylinder 58 is then actuated to fold main shank frame 28 up and over tool bar 24 to an inverted position above and rearward of tool bar 24 (FIGS. 2 and 4). Crumbler basket 34 of main rear auxiliary implement 30 may then also be moved to a raised position. Then the wing front shank frames 66A, 66B, 66C, 66D, 66E, and 66F of the wing sections 14A, 14B, 16A, 16B, 18A, and 18B are folded upwards to a position at or near vertical using hydraulic cylinders 68 (FIG. 4). Wing front shank frames 66A, 66B, 66C, 66D, 66E, and 66F of the wing sections 14A, 14B, 16A, 16B, 18A, and 18B may be folded upwards to the generally vertical position at the same time, or may be folded upwards to the generally vertical position sequentially.

Wing section rear auxiliary implements 78, which may include spring tooth drags, crumbler baskets, spike tooth drags, cultivator shanks, or any combination thereof, may then also be folded upwards to a position at or near vertical. Wing section rear auxiliary implements 78 may also be folded upwards to a generally vertical position at the same time, or may be folded upwards to the generally vertical position sequentially. Further, crumbler basket 34 of main rear auxiliary implement 30 may be moved to its raised position at the same time that wing section rear auxiliary implements 78 are folded upwards to their generally vertical positions.

Diagonally angled draft tubes 72 extending between a forward end of pull hitch tube 20 and a respective tool bar 24 associated with the pair of middle wing sections 16A and 16B are then folded inward, and wing sections 14A, 14B, 16A, 16B, 18A, and 18B are then folded forward by left main fold hydraulic cylinder 116A and right main fold hydraulic cylinder 116B about generally vertical axes 86 and 88 which pass through intermediate wings 13A and 13B to a position adjacent to and generally parallel with pull hitch tube 20 (FIG. 2). Gauge wheel assemblies 56 at the front of main shank frame 28 and gauge wheel assemblies 70 at the front of wing sections 14A, 14B, 16A, 16B, 18A, and 18B are all configured as caster wheels and are not in contact with the ground when agricultural tillage implement 10 is in the folded or transport configuration. As an example, innermost castor wheel assembly pivots about a vertical axis 140. For unfolding the agricultural tillage implement 10 to the operating configuration, the reverse folding sequence is carried out.

Referring now to FIG. 3, the tillage implement is shown in a simplified plan view along with the tractor 15 which provides ground movement for the tillage implement 10. The view in FIG. 3 is that of the operating configuration of FIG. 1 with only the major frames of wing sections 14B, 16B and 18B shown. The wing sections 14A, 16A and 18A are not illustrated but are symmetrical with those stated above. In order to go from the unfolded configuration of FIG. 1 to the folded transport position of FIG. 2, an implement controller 130 activates actuators 116A and 116B through lines 131. Implement controller 130 receives its input from a tractor controller 138 via line 136. Tractor controller 138 would receive operator inputs to cause the actuators 116B and A to extend and move the wing sections 14B, 16B and 18B into the folded position.

Heretofore, the tractor 15 has remained stationary while the towed implement 10 moves backwards in response to the pivoting of the frame elements. This action, especially initially, creates an extra stress on the inner most tool bar lift wheel assemblies 53. In some cases, the tires may end up digging a rut in the soil which creates additional stresses as the implement moves from the unfolded to the folded position.

In accordance with the present embodiment, the system shown in FIG. 3 is employed. In this system, initiation of the movement of the implement between the folded and unfolded position and vice versa creates a command via line 136 to the tractor controller 138 to move the tractor 15 in a forward or rearward direction in synchronism with the movement of the main frame to steer the wheel assemblies toward the intended travel direction while minimizing the movement of the wheel assemblies relative to the ground. The travel direction is shown in dashed lines as 142 for the forward folding configuration. Alternatively, the wing sections may be folded rearward to the position shown as dashed lines 144. As a result, the side stresses on the wheel assemblies are minimized and the formation of a rut is reduced.

The initiation of the unfolding sequence may be sensed by the force on the draw bar 20 through line 134 and an appropriate force sensor or by initiation of the movement of actuators 116A and 116B through line 32. It should be noted that if actuators 116A and 116B are of the hydraulic type, pressure sensors would feed signals via line 132 to implement controller 130 and hence to tractor controller 138. Current tractors also have a controller that is compatible with ISOBUS class 3 configurations so that a towed implement may communicate with the towing tractor. This provides a convenient avenue for the control signals to be sent to the tractor 15. As a result, when the implement is initially started from the unfolded to the folded position, the dash lines in FIG. 3 show that movement is primarily in the hitch 124 which corresponds to movement in the tractor and in the main frame 12 in a rearward direction. Although the wheel assemblies eventually move sideways, they do so without the formation of the rut and corresponding additional stresses thereon.

While this embodiment has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this embodiment pertains and which fall within the limits of the appended claims.

What is claimed is:

1. A method for minimizing stresses on a swivel ground support wheel for an agricultural implement towed by a tractor capable of at least one of commanded forward and rearward movement and having at least one wing frame articulated to be displaced between an unfolded and folded position in which the at least one wing frame pivots at least one of forward and backward, said ground support wheel being connected to the at least one wing frame, said method comprising the steps of:
   initiating displacement between the unfolded and folded positions; and,
   commanding the tractor to move forwards and backwards in response to the wing frame displacement in synchronism so that the swivel ground support wheel is steered toward the correct position for the intended transport direction as the wing frame is displaced while minimizing movement of the ground support wheel assembly relative to the ground.

2. The method as claimed in claim 1 wherein an actuator displaces the wing frame and initiation is sensed by forces on said actuator.

3. The method as claimed in claim 1 wherein the implement has a controller and the tractor has a controller communicating with each other to command the tractor into synchronous movement.

* * * * *